United States Patent
Oh et al.

(10) Patent No.: US 12,432,496 B2
(45) Date of Patent: Sep. 30, 2025

(54) DISPLAY APPARATUS AND CONTROL METHOD THEREOF

(71) Applicant: SAMSUNG ELECTRONICS CO., LTD., Suwon-si (KR)

(72) Inventors: Sanghoon Oh, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/120,804

(22) Filed: Mar. 13, 2023

(65) Prior Publication Data

US 2023/0217168 A1    Jul. 6, 2023

Related U.S. Application Data

(63) Continuation of application No. PCT/KR2022/013795, filed on Sep. 15, 2022.

(30) Foreign Application Priority Data

Dec. 15, 2021 (KR) .................. 10-2021-0180092

(51) Int. Cl.
*H04R 3/12*    (2006.01)
*G06F 3/14*    (2006.01)
(Continued)

(52) U.S. Cl.
CPC ............ *H04R 3/12* (2013.01); *G06F 3/1446* (2013.01); *G06F 3/165* (2013.01); *H04R 1/028* (2013.01);
(Continued)

(58) Field of Classification Search
None
See application file for complete search history.

(56) References Cited

U.S. PATENT DOCUMENTS 8,712,080 B2    4/2014 Tani et al.
9,134,950 B2    9/2015 Choi et al.
(Continued)

FOREIGN PATENT DOCUMENTS

CN    111741412 A    10/2020
EP    3737087 A1    11/2020
(Continued)

OTHER PUBLICATIONS

International Search Report (PCT/ISA/210) issued by the International Searching Authority on Dec. 27, 2022 in corresponding International Application No. PCT/KR2022/013795.
(Continued)

*Primary Examiner* — Duc Nguyen
*Assistant Examiner* — Assad Mohammed
(74) *Attorney, Agent, or Firm* — Sughrue Mion, PLLC

(57) ABSTRACT

A display apparatus is disclosed. The display apparatus includes a display, a speaker, and a processor configured to acquire location information of the display apparatus inside a modular display apparatus including a plurality of display apparatuses, change an output set value of the speaker based on the location information, and control the speaker to output a sound signal received from an external apparatus based on the changed output set value, wherein the external apparatus includes at least one of another display apparatus adjacent to the display apparatus among the plurality of display apparatuses or a source apparatus.

20 Claims, 8 Drawing Sheets

(51) Int. Cl.
*G06F 3/16* (2006.01)
*H04R 1/02* (2006.01)
*H04R 1/26* (2006.01)
*H04R 5/02* (2006.01)
*H04R 5/04* (2006.01)
*H04S 3/00* (2006.01)

(52) U.S. Cl.
CPC ................ *H04R 1/26* (2013.01); *H04R 5/02* (2013.01); *H04R 5/04* (2013.01); *H04S 3/008* (2013.01); *H04R 2201/401* (2013.01); *H04R 2499/15* (2013.01); *H04S 2400/01* (2013.01); *H04S 2400/13* (2013.01)

(56) References Cited

U.S. PATENT DOCUMENTS

| | | | |
|---|---|---|---|
| 9,307,339 | B2 | 4/2016 | Kang |
| 9,354,840 | B2 | 5/2016 | Seo et al. |
| 10,491,985 | B2 | 11/2019 | Lee et al. |
| 2011/0293122 | A1* | 12/2011 | Tani ........................ H04R 27/00 345/1.3 |
| 2020/0021966 | A1 | 1/2020 | Wylie et al. |
| 2020/0310736 | A1* | 10/2020 | Pastrik ................. G06F 1/1605 |
| 2021/0211038 | A1* | 7/2021 | Healy ..................... H04R 5/04 |
| 2022/0319526 | A1* | 10/2022 | Guo ....................... G10L 19/008 |
| 2023/0045236 | A1 | 2/2023 | Chu et al. |

FOREIGN PATENT DOCUMENTS

| | | | |
|---|---|---|---|
| JP | 2011-250113 | A | 12/2011 |
| JP | 5137864 | B2 | 2/2013 |
| JP | 2013-64802 | A | 4/2013 |
| JP | 2016-58873 | A | 4/2016 |
| JP | 6335597 | B2 | 5/2018 |
| JP | 2020-515303 | A | 5/2020 |
| KR | 10-2015-0005435 | A | 1/2015 |
| KR | 10-1632572 | B1 | 7/2016 |
| KR | 10-1957241 | B1 | 3/2019 |
| KR | 10-2072146 | B1 | 2/2020 |

OTHER PUBLICATIONS

Written Opinion (PCT/ISA/237) issued by the International Searching Authority on Dec. 27, 2022 in corresponding International Application No. PCT/KR2022/013795.
European Extended Search Report issued Nov. 5, 2024 by the European Patent Office for EP Patent Application No. 22907626.0.
Communication dated Jul. 21, 2025, issued by the European Patent Office in European Application No. 22907626.0.

* cited by examiner

DISPLAY APPARATUS AND CONTROL METHOD THEREOF

CROSS-REFERENCE TO RELATED APPLICATIONS

This application is a continuation application of International Application No. PCT/KR2022/013795, filed on Sep. 15, 2022, which claims priority to Korean Patent Application No. 10-2021-0180092 filed on Dec. 15, 2021 in the Korean Intellectual Property Office, the disclosures of which are herein incorporated by reference.

TECHNICAL FIELD

The disclosure relates to a display apparatus and a control method thereof, and more particularly, to a display apparatus including a speaker, and a control method thereof.

BACKGROUND

Display systems with a variety of features and forms are continuously being developed and distributed.

In particular, currently developed display systems as compared to display systems of the past are increasingly becoming larger and having higher resolutions.

A conventional display system may be integrally include a speaker configured to generate sounds associated with the images displayed on the display system, instead of necessitating connection to a separate speaker external to the display system.

In the case of an enlarged display system, if a plurality of speakers disposed at a distance from each other are included in the system and output the same sound signal, a problem of sound wave interference (i.e., constructive and destructive interference) may occur and may result in a distorted sound signal as perceived by a user.

For example, if one display apparatus incorporated into an enlarged display system and another display apparatus of that enlarged display system are separated by a specific distance or more and output the same sound signal, the output sound waves from each of the display apparatuses may interfere with each other so that a user perceives a distorted sound signal different from the original intended sound signal.

Accordingly, there has been a demand for a method for a display system to output a sound signal by using a speaker included in a display system that minimizes sound wave interference so that the sound signal is not distorted.

SUMMARY

The disclosure is for addressing the aforementioned need, and the purpose of the disclosure is in providing a display apparatus that controls output of a speaker included in the display apparatus in consideration of the location of the display apparatus, and a control method thereof.

According to an embodiment of the disclosure for achieving the aforementioned purpose, a display apparatus configured to be included with other display apparatuses of a plurality of display apparatuses in a modular display apparatus includes a display, a speaker, and a processor configured to acquire location information of the display apparatus inside the modular display apparatus including the plurality of display apparatuses, change an output set value of the speaker based on the location information, and control the speaker to output a sound signal received from an external apparatus based on the changed output set value, wherein the external apparatus includes at least one of (i) at least one of the other display apparatuses that is adjacent to the display apparatus and (ii) a source apparatus.

Here, the display apparatus may further include a memory configured to store sound channel information respectively corresponding to location information of each of the plurality of display apparatuses, and the processor may identify a sound channel corresponding to the location information of the display apparatus based on the sound channel information stored in the memory, and change the output set value of the speaker to correspond to the identified sound channel.

Here, the speaker may include a full range speaker, and the processor may acquire a gain value corresponding to the identified sound channel, and change an output set value of the full range speaker according to the acquired gain value.

Here, the processor may, based on a sound signal received from the external apparatus being a multi-channel sound signal, acquire a sound signal corresponding to the identified sound channel, and control the speaker to output the acquired sound signal.

Also, the processor may, based on the location information of the display apparatus, control the speaker such that the output of the speaker is muted, and control the display to output some images corresponding to the location information among images corresponding to a video signal received from the external apparatus.

In addition, the processor may, based on the display apparatus being located relatively on the upper side inside the modular display apparatus on the basis of the location information of the display apparatus, change the output set value such that the speaker corresponds to a tweeter speaker outputting a sound of a high pitch range, based on the display apparatus being located relatively in the center inside the modular display apparatus, change the output set value such that the speaker corresponds to a mid-range speaker outputting a sound of a middle pitch range, and based on the display apparatus being located relatively on the lower side inside the modular display apparatus, change the output set value such that the speaker corresponds to a woofer speaker outputting a sound of a low pitch range.

Further, the processor may, based on the display apparatus being located relatively on the left side inside the modular display apparatus on the basis of the location information of the display apparatus, change the output set value to correspond to a speaker outputting a sound of a left channel, and based on the display apparatus being located relatively on the right side inside the modular display apparatus on the basis of the location information of the display apparatus, change the output set value to correspond to a speaker outputting a sound of a right channel.

Also, the processor may provide the received sound signal to another display apparatus that is connected to the display apparatus and arranged to be adjacent among the plurality of display apparatuses.

In addition, the processor may, based on receiving a user instruction through a UI for setting sound channel information corresponding to the location information of the plurality of respective display apparatuses, identify sound channel information of the speaker based on the user instruction, and change the output set value of the speaker to correspond to the identified sound channel information.

Further, the processor may, based on receiving a user input indicating the number and the arrangement relation of the plurality of display apparatuses, acquire the location information of the plurality of respective display apparatuses based on the user input.

According to an embodiment of the disclosure for achieving the aforementioned purpose, a control method of a display apparatus configured to be included with other display apparatuses of a plurality of display apparatuses in a modular display apparatus includes the steps of acquiring location information of the display apparatus inside the modular display apparatus including the plurality of display apparatuses, changing an output set value of a speaker included in the display apparatus based on the location information, and controlling the speaker to output a sound signal received from an external apparatus based on the changed output set value, and the external apparatus may include at least one of (i) at least one of the other display apparatuses that is adjacent to the display and (ii) a source apparatus.

Here, the display apparatus may include sound channel information corresponding to location information of the plurality of respective display apparatuses, and the step of changing the output set value may include the steps of identifying a sound channel corresponding to the location information of the display apparatus based on the stored sound channel information, and changing the output set value of the speaker to correspond to the identified sound channel.

Here, the speaker may include a full range speaker, and the step of changing the output set value may include the steps of acquiring a gain value corresponding to the identified sound channel, and changing an output set value of the full range speaker according to the acquired gain value.

Also, the control method may further include the step of, based on a sound signal received from the external apparatus being a multi-channel sound signal, acquiring a sound signal corresponding to the identified sound channel, and the step of controlling the speaker may include the step of controlling the speaker to output the acquired sound signal.

In addition, the control method may further include the steps of, based on the location information of the display apparatus, controlling the speaker such that the output of the speaker is muted, and controlling the display to output some images corresponding to the location information among images corresponding to a video signal received from the external apparatus.

Further, the step of changing the output set value may include the steps of, based on the display apparatus being located relatively on the upper side inside the modular display apparatus on the basis of the location information of the display apparatus, changing the output set value such that the speaker corresponds to a tweeter speaker outputting a sound of a high pitch range, based on the display apparatus being located relatively in the center inside the modular display apparatus, changing the output set value such that the speaker corresponds to a mid-range speaker outputting a sound of a middle pitch range, and based on the display apparatus being located relatively on the lower side inside the modular display apparatus, changing the output set value such that the speaker corresponds to a woofer speaker outputting a sound of a low pitch range.

Also, the step of changing the output set value may include the steps of, based on the display apparatus being located relatively on the left side inside the modular display apparatus on the basis of the location information of the display apparatus, changing the output set value to correspond to a speaker outputting a sound of a left channel, and based on the display apparatus being located relatively on the right side inside the modular display apparatus on the basis of the location information of the display apparatus, changing the output set value to correspond to a speaker outputting a sound of a right channel.

In addition, the control method may include the step of providing the received sound signal to another display apparatus that is connected to the display apparatus and arranged to be adjacent among the plurality of display apparatuses.

Further, the control method may further include the steps of, based on receiving a user instruction through a UI for setting sound channel information corresponding to the location information of the plurality of respective display apparatuses, identifying sound channel information of the speaker based on the user instruction, and changing the output set value of the speaker to correspond to the identified sound channel information.

Also, the step of acquiring the location information may include the step of, based on receiving a user input indicating the number and the arrangement relation of the plurality of display apparatuses, acquiring the location information of the plurality of respective display apparatuses based on the user input.

According to the various embodiments of the disclosure, a modular display apparatus comprising a plurality of display apparatuses (or, display modules) may output a sound signal by using an internal speaker so that wave interference can be minimized, and a non-distorted sound signal may be provided to a user.

Also, a multi-channel speaker environment may be constructed by using speakers included in a plurality of respective display apparatuses.

Further, speakers included in a plurality of respective display apparatuses may output sound signals of different pitch ranges from one another, and accordingly, sound signals that are not distorted may be provided to a user.

DETAILED DESCRIPTION

Figure 1:
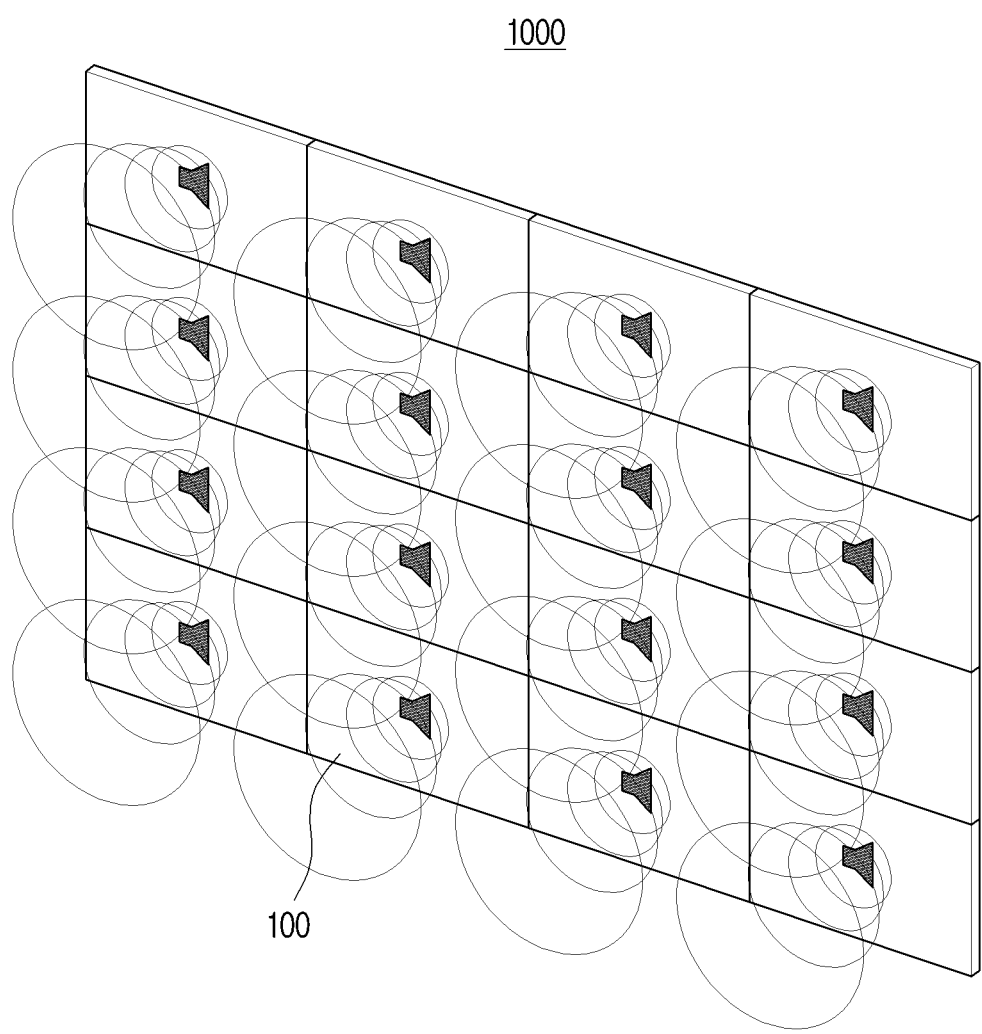
FIG. 1 is a diagram illustrating a modular display apparatus and a display apparatus according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the idea and the technical scope disclosed herein. Further, in describing the embodiments, in case it is determined that detailed explanation of related known technologies may unnecessarily confuse the gist of the disclosure, the detailed explanation will be omitted.

In addition, terms such as "first," "second" and the like may be used to describe various elements, but the terms are not intended to limit the elements. Such terms are used only to distinguish one element from another element.

Further, singular expressions include plural expressions, as long as they do not obviously mean differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the disclosure, "a module" or "a part" may perform at least one function or operation, and may be implemented as hardware or software, or as a combination of hardware and software. In addition, a plurality of "modules" or "parts" may be integrated into at least one module and implemented as at least one processor (not shown), excluding "a module" or "a part" that needs to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram illustrating a modular display apparatus and a display apparatus according to an embodiment of the disclosure.

Referring to FIG. 1, a modular display apparatus 1000 may consist of a plurality of display apparatuses 100-1, . . . , 100-n. The modular display apparatus 1000 may display a video signal. The modular display apparatus 1000 may be implemented as a television (TV), a video wall, a large format display (LFD), digital signage, a digital information display (DID), a projector display, or any other device configured to display an electronic image. The modular display apparatus 1000 may be implemented as a liquid crystal display (LCD), an organic light-emitting diode (OLED), liquid crystal on silicon (LCoS), digital light processing (DLP), a quantum dot (QD) display panel, quantum dot light-emitting diodes (QLED), cathode ray tube (CRT), laser TV, or any other display configured to generate an electronic image.

According to an embodiment, the modular display apparatus 1000 may be implemented as a form including a plurality of display apparatuses (or, modules) 100-1, . . . , 100-n. For example, as illustrated in FIG. 1, the plurality of display apparatuses 100-1, . . . , 100-n may be combined and implement one display apparatus (i.e., the modular display apparatus 1000). Each of the plurality of display apparatuses 100-1, . . . , 100-n according to an embodiment of the disclosure may include a plurality of self-emission elements. For example, the self-emission element may be at least one of a light emitting diode (LED) or a micro LED.

Also, each of the plurality of display apparatuses 100-1, . . . , 100-n may be implemented as an LED cabinet including a plurality of light emitting diode (LED) elements. For example, the LED elements may be implemented as RGB LEDs, and the RGB LEDs may include a red LED, a green LED, and a blue LED. The LED elements may include a white LED in addition to the RGB LEDs.

In some embodiments, the LED elements may be implemented as micro LEDs. For example, the micro LEDs may be LEDs in a size of about 5-100 micrometers, and may be arranged as micro-mini light emitting elements that emit light by themselves without a color filter.

In some embodiments, each of the plurality of display apparatuses 100-1, . . . , 100-n included in the modular display apparatus 1000 may be disposed in electronic communication with each another. For example, at least one display apparatus that received a control signal, a video signal, a sound signal, and/or additional signals from a source apparatus (not shown) may transmit the received control signal, video signal, sound signal, and/or additional signals to another display apparatus that may be serially connected with it. Accordingly, the control signal, the video signal, the sound signal, and/or additional signals may be sequentially transmitted to all of the plurality of display apparatuses 100-1, . . . , 100-n.

In some embodiments, as the resolution and/or the size of the modular display apparatus 1000 increases, the number of the plurality of display apparatuses 100-1, . . . , 100-n included in the modular display apparatus 1000 may increase in proportion thereto. The relation of communicative connection among the plurality of display apparatuses 100-1, . . . , 100-n may be modified in a variety of complex manners and/or forms, other than a conventional standardized relation of communicative connection or the daisy chain relation of communicative connection.

Each of the plurality of display apparatuses 100-1, . . . , 100-n may include a speaker, so that the modular display apparatus 1000 need not be connected with an external speaker and/or require output of a sound signal through such an external speaker, and may instead output a sound signal through the integral speaker(s) provided within itself.

Referring to FIG. 1, if the modular display apparatus 1000 of a 4K (3840×2160) resolution is implemented by connecting the plurality of display apparatuses 100-1, . . . , 100-n of which pixel pitch is 0.84 mm, when the resolution of each of the plurality of display apparatuses 100-1, . . . , 100-n is 960×540, the modular display apparatus 1000 includes 16 display apparatuses 100-1, . . . , 100-16 arranged in forms of 4×4 matrices in total. If the speakers included in the respective 16 display apparatuses 100-1, . . . , 100-16 output the same sound signal, there may be a sound distortion problem due to constructive and destructive sound wave interference from the interaction of sound waves produced by the speakers and resulting in a distorted output that may be provided to the user.

The effect of sound wave interference and associated problem of distorted sound output may be exacerbated by enlargement of the modular display apparatus 1000 due to the separation distance and the arrangement distance among the plurality of display apparatuses 100-1, . . . , 100-n increasing. For example, if the speakers included in each of two display apparatuses (e.g., a first display apparatus 100-1 and a sixteenth display apparatus 100-16) is separated by a specific distance or more and output the same sound signal, there is an increased risk that wave interference and sound distortion may occur between the same outputs.

Accordingly, to minimize sound distortion associated with sound wave interference, some of the speakers included in the plurality of respective display apparatuses 100-1, . . . , 100-n may output sound signals that are different from the others.

For example, some display apparatuses may output sound signals of different pitch ranges from the other display apparatuses. Detailed explanation in this regard will be made with reference to FIG. 2.

Figure 2:
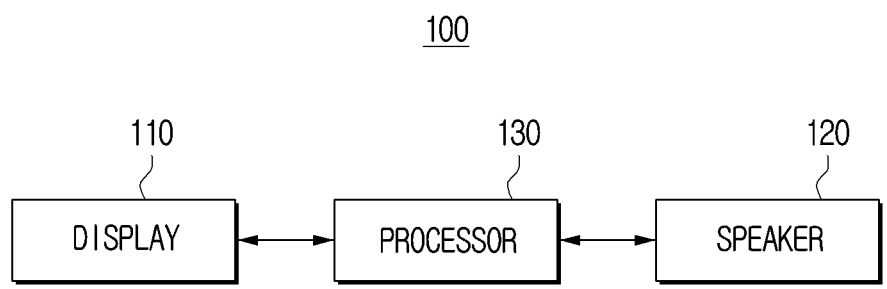
FIG. 2 is a block diagram illustrating a configuration of a display apparatus according to an embodiment of the disclosure.

FIG. 2 is a block diagram illustrating a configuration of a display apparatus according to an embodiment of the disclosure.

According to FIG. 2, the display apparatus 100 includes a display 110, a speaker 120, and a processor 130.

The display apparatus 100 may be one of modular display apparatuses (i.e., the plurality of display apparatuses 100-1, . . . , 100-n included in the modular display apparatus 1000), may be implemented as an independent display apparatus 100 by itself, and may include a plurality of display modules.

In some embodiments, the display apparatus 100 may include the display 110 that is configured to display various images. As used in this disclosure, an image may refer to a still image, a moving image, and/or a portion of still/moving image associated with the modular display apparatus 1000. For example, as each of the plurality of display apparatuses 100-1, . . . , 100-n may provide different parts (or, some parts) of an image so that an entirety/portion of the modular display apparatus 1000 may provide the whole image. Specifically, the first display apparatus 100-1 among the plurality of display apparatuses 100-1, . . . , 100-n may acquire the location information of the first display apparatus 100-1 inside the modular display apparatus 1000, and provide a part corresponding to the location information in an image.

The display 110 according to an embodiment of the disclosure may be implemented as a display including self-emission elements, or a display including non-self-emission elements and a backlight. For example, the display 110 may be implemented as displays in various forms such as a liquid crystal display (LCD), an organic light emitting diodes (OLED) display, a light emitting diodes (LED) display, a micro LED, a mini LED, a plasma display panel (PDP), a quantum dot (QD) display, and a quantum dot light emitting diodes (QLED) display. Inside the display 110, driving circuits that may be implemented in forms (such as an a-silicon thin film transistor (TFT), a low temperature poly silicon (LTPS) TFT, an organic TFT (OTFT), metal oxide field effect transistor (MOSFET), or another component configured to provide and control power to a display element). A backlight unit, and other display components may also be included inside the display 110. The display 110 may be implemented as a touch screen combined with a touch sensor, a flexible display, a rollable display, a 3D display, and/or a display to which a plurality of display modules are physically connected.

The speaker 120 may output a rendered sound signal. The speaker 120 may include at least one speaker unit (or an audio amplifier). As an example, the speaker 120 may be implemented as at least one full range speaker designed to output almost all pitch ranges of audible frequencies.

As another example, the speaker 120 may include a plurality of speakers for outputting of multiple channels of audio signals. For example, the speaker 120 may include a plurality of speakers each of which are associated with a different channel that has been mixed for that particular channel output. In some embodiments, at least one channel is output by as a speaker array including a plurality of speaker units for reproducing different frequency bands (e.g., bass, mid-range, tweeter).

The processor 130 may be electronically connected with the memory (not shown), and may be configured to control the overall operations of the display apparatus 100.

In some embodiments, the processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), or a communication processor (CP), an ARM processor, and an artificial intelligence (AI) processor, or may be defined by the terms. Also, the processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory.

According to an embodiment, the processor 130 may be configured to acquire the location information of the display apparatus 100 inside the system 1000 including the plurality of display apparatuses 100-1, . . . , 100-n. After acquiring the location information, the processor 130 may then change the output set value of the speaker 120 based on the location information.

Then, the processor 130 may control the speaker 120 to output a sound signal received from an external apparatus based on the changed output set value.

In some embodiments, the external apparatus may be a source apparatus (not shown) providing an image including a video signal, a sound signal, etc. to the system 1000, or another display apparatus 100' arranged to be adjacent to the display apparatus 100.

Detailed explanation in this regard will be made with reference to FIG. 3.

Figure 3:
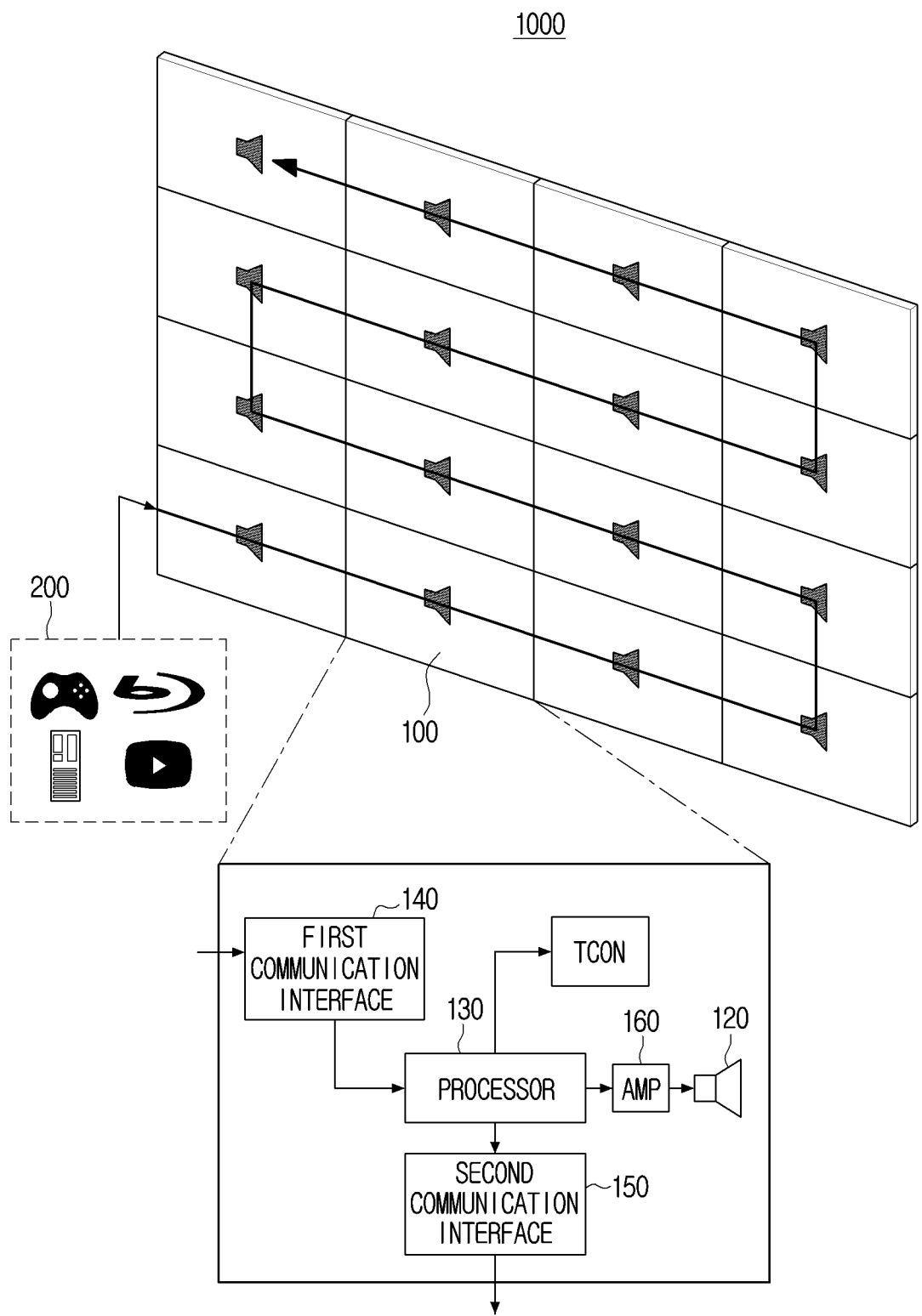
FIG. 3 is a diagram illustrating transmission of a signal among a plurality of display apparatuses according to an embodiment of the disclosure.

FIG. 3 is a diagram illustrating transmission of a signal among a plurality of display apparatuses according to an embodiment of the disclosure.

Referring to FIG. 3, the plurality of display apparatuses 100-1, . . . , 100-n included in the system 1000 may be connected by various methods, and all of the display apparatuses 100-1, . . . , 100-n may receive an image by a method wherein any one display apparatus among the plurality of display apparatuses 100-1, . . . , 100-n receives an image received from the source apparatus 200 and transmits the image to another adjacent display apparatus.

The display apparatus 100 may include a first communication interface 140 and a second communication interface 150. The display apparatus 100 may receive an image (e.g., a video signal, a sound signal) from the source apparatus 200 or another adjacent display apparatus through the first communication interface 140.

The display apparatus 100 may provide (or, transmit) the received image (e.g., the received video signal, sound signal) to another display apparatus 100' that is arranged to be adjacent to the display apparatus 100 and configured to be connected through the second communication interface 160.

Detailed explanation in this regard will be made with reference to FIG. 4.

Figure 4:
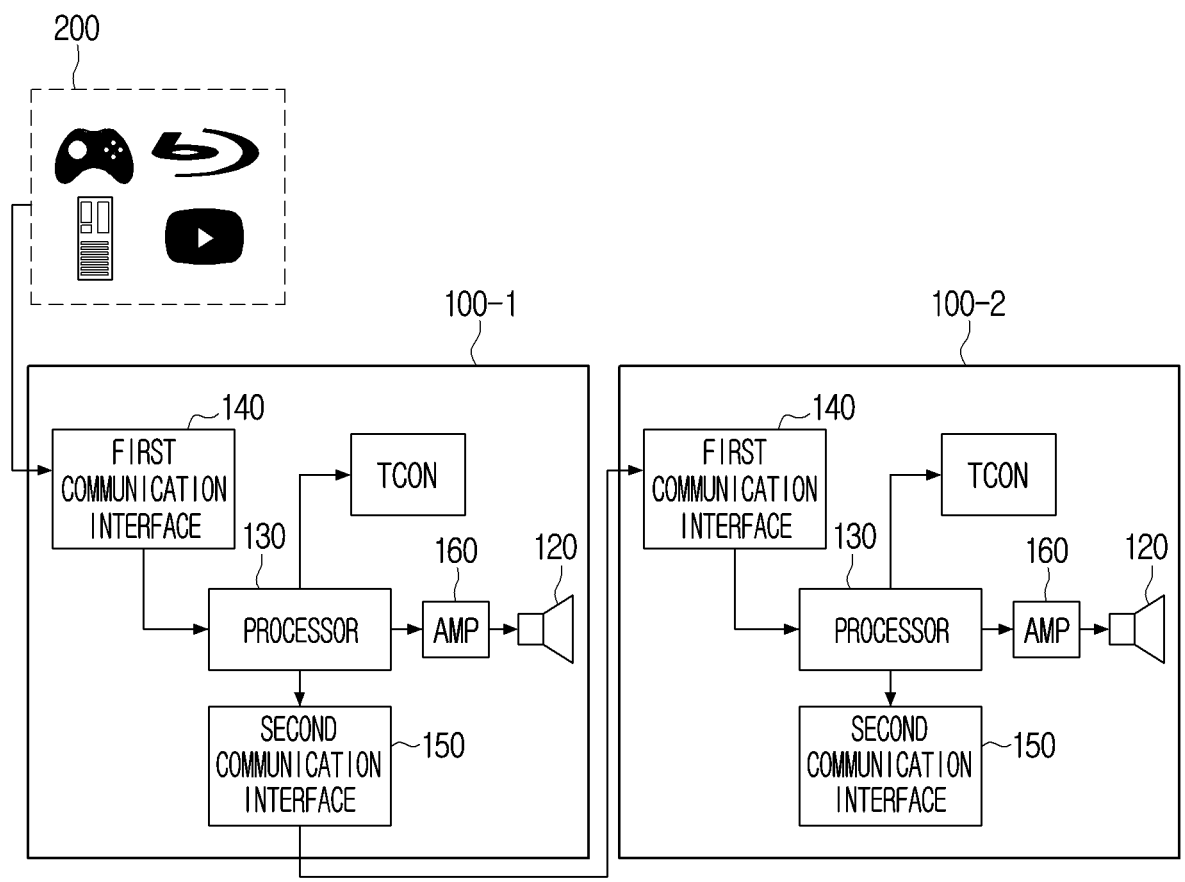
FIG. 4 is a diagram illustrating an operation of a display apparatus according to an embodiment of the disclosure.

FIG. 4 is a diagram illustrating an operation of a display apparatus according to an embodiment of the disclosure.

Referring to FIG. 4, the first display apparatus 100-1 may receive, for example, a video signal, a sound signal, and/or other signal from the source apparatus 200 through the first communication interface 140, and control an image output part (e.g., a timing controller (TCON)) and display some video signals corresponding to the location information of the first display apparatus 100-1 among video signals.

The first display apparatus 100-1 may control the speaker 120 and output a sound signal.

In particular, the first display apparatus 100-1 may change the output set value of the speaker 120 based on the location information, and output a received sound signal based on the changed output set value. Specifically, the processor 130 included in the first display apparatus 100-1 may control the output set value of the amp 160 based on the location information of the first display apparatus 100-1, and the amp 160 may amplify the sound signal received from the processor 130 according to the output set value and then provide the signal to the speaker 120 so that the speaker 120 may output the received sound signal.

In some embodiments, the feature of changing the output set value of the speaker 120 may include that (i) the processor 130 changes the output set value of the amp 160 located between the processor 130 and the speaker 120, and the amp 160 amplifies a sound signal based on the changed output set value according to control by the processor 130 and then transmits the signal to the speaker 120, or (ii) that the amp 160 acquires a sound signal of a specific channel corresponding to the location information of the display apparatus 100 from a sound signal, and then transmits the signal to the speaker 120.

For example, the amp 160 may provide only a sound signal of a specific channel in a sound signal received from the processor 130 to the speaker 120, or amplify a specific pitch range and then provide the signal to the speaker 120. Hereinafter, for simplicity, the description will generally describe the above feature as the feature that the processor 130 changes the output set value of the speaker 120.

Then, the first display apparatus 100-1 may transmit a video signal and a sound signal through the second communication interface 150 to the second display apparatus 100-2 arranged to be adjacent to the first display apparatus 100-1. Here, the display apparatus arranged to be adjacent may mean that the display apparatus is arranged to be physically adjacent, but the disclosure is not limited thereto, and it may mean that the display apparatus is connected with the first display apparatus 100-1 via wire or wirelessly, and is configured to receive a video signal, a sound signal, or other signal transmitted by the first display apparatus 100-1.

The second display apparatus 100-2 may control the image output part (e.g., a TCON), and display some video signals corresponding to the location information of the second display apparatus 100-2 among video signals received from the first display apparatus 100-1. Also, the second display apparatus 100-2 may control the speaker 120 and output a sound signal.

The second display apparatus 100-2 may also change the output set value of the speaker 120 based on the location information of the second display apparatus 100-2, and then output a sound signal.

Returning to FIG. 3, as a connection cable between the display apparatus 100 and the source apparatus 200 or between the display apparatus 100 and another adjacent display apparatus, V-by-One may be used. However, the disclosure is not limited thereto, and a high definition multimedia interface (HDMI) cable, a low voltage differential signals (LVDS) cable, a digital visual interface (DVI) cable, a D-subminiature (D-SUB) cable, a video graphics array (VGA) cable, or an optical cable, may also be used.

In some embodiments, the first communication interface 140 may be configured to receive an image from the source apparatus 200 or another adjacent display apparatus through wireless communication. Also, the second communication interface 150 may be configured to transmit an image to another adjacent display apparatus through wireless communication. In this case, the communication interface 140 may include a Wi-Fi module (not shown), a Bluetooth module (not shown), an infrared (IR) module, a local area network (LAN) module, an Ethernet module, or other wireless module. Each communication module may be implemented in a form of at least one hardware chip. A wireless communication module may include at least one communication chip that performs communication according to various wireless communication standards such as Zigbee, a Universal Serial Bus (USB), a Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), or 5th Generation (5G), other than the aforementioned communication methods. However, this is merely an example, and each of the first communication interface 140 and the second communication interface 150 may use at least one communication module among various communication modules.

The relation of communicative connection among the plurality of display apparatuses 100-1, . . . , 100-n illustrated in FIG. 3 is merely an example, and the disclosure is not limited thereto. For example, the plurality of display apparatuses 100-1, . . . , 100-n can have a daisy chain relation of communication connection, or other various relations of communicative connection.

In some embodiments, each of the plurality of display apparatuses 100-1, . . . , 100-n may acquire location information inside the modular display apparatus 1000.

For example, the processor 130 may (i) perform communication with another adjacent display apparatus, (ii) acquire location information of each of the plurality of display apparatuses 100-1, . . . , 100-n included in the modular display apparatus 1000, and (iii) acquire location information of the display apparatus 100 inside the modular display apparatus 1000.

However, this is merely an example, and the processor 130 may acquire location information of the display apparatus 100 inside the modular display apparatus 1000 by using various conventional methods of acquiring location information of each of the plurality of display apparatuses 100-1, ..., 100-*n* in the modular display apparatus 1000 (i.e., the display system including the plurality of display apparatuses 100-1, ..., 100-*n*).

In some embodiments, if a user input indicating the number and the arrangement relation of the plurality of display apparatuses 100-1, ..., 100-*n* is received, the processor 130 may acquire the location information of each of the plurality of display apparatuses 100-1, ..., 100-*n* based on the user input.

Then, the processor 130 may change the output set value of the speaker 120 based on the location information of the display apparatus 100. Hereinafter, various embodiments wherein the processor 130 changes the output set value of the speaker 120 will be described.

Figure 5:
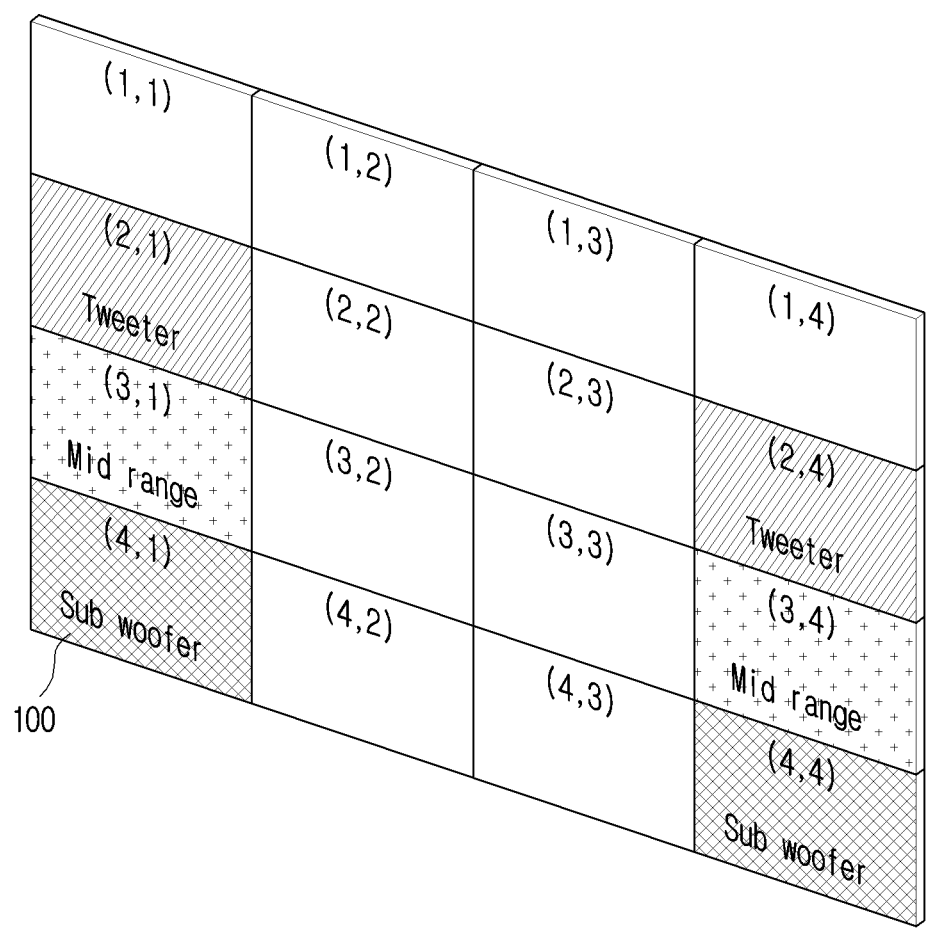
FIG. 5 is a diagram illustrating operations of speakers included in a plurality of respective display apparatuses according to an embodiment of the disclosure.

FIG. 5 is a diagram illustrating operations of speakers included in a plurality of respective display apparatuses according to an embodiment of the disclosure.

Referring to FIG. 5, the processor 130 may control the speaker 120 included in the display apparatus 100 to output a specific pitch range based on location information.

The display apparatus 100 may include a memory (not shown) storing information on pitch ranges that can be output, which corresponds to the location information of each of the plurality of display apparatuses 100-1, ..., 100-*n*.

The speaker 120 included in the display apparatus 100 may be a full range speaker, and the processor 130 may control the speaker 120 such that the speaker 120 outputs only some pitch ranges corresponding to location information based on information on pitch ranges that can be output, which corresponds to the location information stored in the memory, but not all pitch ranges that can be output. As another example, the processor 130 may acquire only sound signals of some pitch ranges corresponding to location information among sound signals received from an external apparatus based on the information on pitch ranges that can be output, which corresponds to the location information stored in the memory, and control the speaker 120 to output the acquired sound signals.

FIG. 5 is a diagram illustrating a case wherein the speakers included in the plurality of respective display apparatuses 100-1, ..., 100-*n* are set to output sound signals of different pitch ranges from one another according to an embodiment.

Referring to FIG. 5, if the display apparatus 100 is located relatively on the upper side inside the modular display apparatus 1000 based on the location information of the display apparatus 100, the processor 130 may change the output set value of the amplifier 160 such that the speaker 120 corresponds to a tweeter speaker outputting a sound of a high pitch range.

For example, in order that the speakers 120 included in the display apparatuses 100 corresponding to the location information (2, 1) to the location information (2, 4) correspond to a tweeter speaker outputting a sound of a high pitch range, the processor 130 may change the output set value related to the amp 160 that is located between the processor 130 and the speakers 120 and provides a sound signal to the speakers 120.

For example, the amp 160 may amplify a sound signal based on the output set value changed according to control by the processor 130 and then transmit the signal to the speakers 120, and the speakers 120 may output the sound signal received from the amp 160.

As another example, if the display apparatus 100 is located relatively in the center inside the modular display apparatus 1000, the processor 130 may change the output set value such that the speaker 120 corresponds to a mid-range speaker outputting a sound of a middle pitch range.

For example, the output set values of the speakers 120 included in the display apparatuses 100 corresponding to the location information (3, 1) to the location information (3, 4) may be changed such that the speakers 120 correspond to a mid-range speaker outputting a sound of a middle pitch range.

As another example, if the display apparatus 100 is located relatively on the lower side inside the modular display apparatus 1000, the processor 130 may change the output set value such that the speaker 120 corresponds to a woofer speaker outputting a sound of a low pitch range.

For example, the output set values of the speakers 120 included in the display apparatuses 100 corresponding to the location information (4, 1) to the location information (4, 4) may be changed such that the speakers 120 correspond to a woofer speaker outputting a sound of a low pitch range.

Referring to FIG. 5, in some display apparatuses among the plurality of display apparatuses 100-1, ..., 100-*n*, pitch ranges that can be output may not be set.

For example, the speakers 120 included in the display apparatuses 100 corresponding to the location information (1, 1) to the location information (1, 4) may be controlled by the processor 130 included in each of the display apparatuses 100 such that the outputs are muted.

In this case, each of the display apparatuses 100 corresponding to the location information (1, 1) to the location information (1, 4) may output some images corresponding to the location information among images corresponding to a video signal received from an external apparatus.

Meanwhile, FIG. 5 is merely an example of information on pitch ranges that can be output, which corresponds to the location information of each of the plurality of display apparatuses 100-1, ..., 100-*n*, and the disclosure is not limited thereto.

In some embodiments, a plurality of information on pitch ranges that can be output may be stored in the memory, and the processor 130 may acquire any one information according to a user's instruction for selection, and change the output set value of the speaker 120 included in each of the plurality of display apparatuses 100-1, ..., 100-*n*.

In this example, unlike the configuration illustrated in FIG. 5, the speakers 120 included in the display apparatuses 100 corresponding to the location information (4, 1) to the location information (4, 4) may be controlled by the processor 130 included in each of the display apparatuses 100 such that the outputs are muted.

The output set values of the speakers 120 included in the display apparatuses 100 corresponding to the location information (1, 1) to the location information (1, 4) may be changed such that the speakers 120 correspond to a mid-range speaker outputting a sound of a middle pitch range.

The pitch ranges of the speaker 120 that can be output may not be fixed according to the location information of the display apparatus 100, and the pitch ranges of the speaker 120 that can be output can be changed according to the information on pitch ranges that can be output, a user's setting, the type of an image, and/or the time when an image is output.

For example, if the time when an image is output is afternoon, early morning, or some particular time set by a user, the number of the speakers 120 outputting a sound of a high pitch range or a low pitch range may be reduced, and the number of the speakers 120 outputting a sound of a middle pitch range may be increased.

As illustrated in FIG. 5, the speakers 120 included in the plurality of respective display apparatuses 100-1, ..., 100-n do not output the same sound signal, but the speakers 120 output sound signals of different pitch ranges from one another according to the locations of the plurality of respective display apparatuses 100-1, ..., 100-n, and thus distortion according to sound wave interference may not occur.

In some embodiments, the processor 130 changing the output set value of the speaker 120 may include that (i) the processor 130 changes the output set value of the amp 160 located between the processor 130 and the speaker 120, (ii) the amp 160 amplifies a sound signal based on the changed output set value according to control by the processor 130, and (iii) the amp 160 transmits the signal to the speaker 120. Additionally, the speaker 120 may output the sound signal received from the amp 160.

For example, the processor 130 included in the display apparatus 100 may control the amp 160 to acquire a sound signal of a specific channel corresponding to the location information of the display apparatus 100 from a sound signal, or amplify a specific pitch range. Then, the amp 160 may provide only the sound signal of a specific channel in the sound signal received from the processor 130 to the speaker 120, or amplify a specific pitch range and then provide the signal to the speaker 120.

The speaker 120 may then output the sound signal received from the amp 160.

Figure 6:
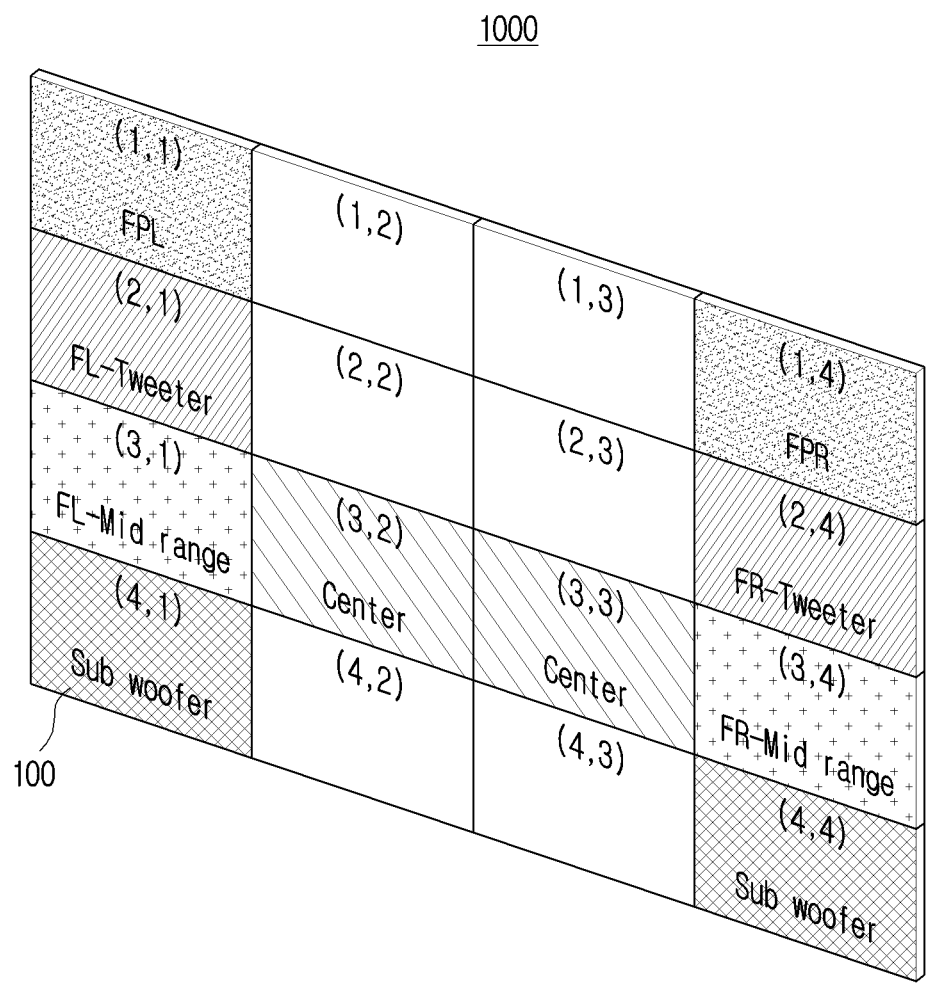
FIG. 6 is a diagram illustrating operations of speakers included in a plurality of respective display apparatuses according to another embodiment of the disclosure.

FIG. 6 is a diagram illustrating operations of speakers included in a plurality of respective display apparatuses according to another embodiment of the disclosure.

Referring to FIG. 6, the processor 130 may control the speaker 120 included in the display apparatus 100 to output a sound signal corresponding to a specific sound channel based on the location information.

The display apparatus 100 may include a memory (not shown) storing sound channel information corresponding to the location information of the plurality of respective display apparatuses 100-1, ..., 100-n.

For example, the speaker 120 included in the display apparatus 100 may be a full range speaker, and the processor 130 may not control the speaker 120 to output sound signals of multi channels, but may control the speaker 120 to output only a sound signal corresponding to a specific sound channel based on the sound channel information corresponding to the location information stored in the memory.

For example, the processor 130 may identify a channel corresponding to the location information of the display apparatus 100, and change the output set value of the amp 160 according to the identified channel.

Then, the amp 160 may extract (or, acquire) a sound signal of a specific channel from a received sound signal based on the changed output set value according to control by the processor 130, and then provide the sound signal of a specific channel to the speaker 120.

If a sound signal received from an external apparatus is a multi-channel sound signal including sound signals corresponding to the plurality of respective sound channels, the processor 130 according to an embodiment may control the output set value of the amp 160 and acquire a sound signal of a specific channel corresponding to the location information of the display apparatus 100. Then, the processor 130 may control the amp 160 and provide the sound signal of a specific channel to the speaker 120, and the speaker 120 may output the received sound signal of a specific channel.

FIG. 6 is a diagram for illustrating a case wherein the speakers included in the plurality of respective display apparatuses 100-1, ..., 100-n are set to operate in different sound channels from one another according to an embodiment.

Referring to FIG. 6, if the display apparatus 100 is located relatively on the left side inside the modular display apparatus 1000 based on the location information of the display apparatus 100, the processor 130 may change the output set value of the speaker 120 to correspond to a speaker outputting a sound of a left channel.

For example, the output set values of the speakers 120 included in the display apparatuses 100 corresponding to the location information (1, 1), the location information (2, 1), and the location information (3, 1) may be changed to correspond to speakers outputting sounds of left channels.

Specifically, as the display apparatus 100 corresponding to the location information (1, 1) is located on the uppermost side inside the modular display apparatus 1000, the output set value may be changed to output a sound of a front presence left (FPL) channel.

Also, as the display apparatus 100 corresponding to the location information (2, 1) is located relatively on the upper side inside the modular display apparatus 1000, the output set value may be changed to output a sound of a front left tweeter (FL-Tweeter) channel.

Further, as the display apparatus 100 corresponding to the location information (3, 1) is located relatively in the center inside the modular display apparatus 1000, the output set value may be changed to output a sound of a front left mid-range (FL-Mid-Range) channel.

As another example, the output set values of the speakers 120 included in the display apparatuses 100 corresponding to the location information (1, 4), the location information (2, 4), and the location information (3, 4) may be changed to correspond to speakers outputting sounds of right channels.

Specifically, as the display apparatus 100 corresponding to the location information (1, 4) is located on the uppermost side inside the modular display apparatus 1000, the output set value may be changed to output a sound of a front presence right (FPR) channel.

Also, as the display apparatus 100 corresponding to the location information (2, 4) is located relatively on the upper side inside the modular display apparatus 1000, the output set value may be changed to output a sound of a front right tweeter (FR-Tweeter) channel.

Further, as the display apparatus 100 corresponding to the location information (3, 4) is located relatively in the center inside the modular display apparatus 1000, the output set value may be changed to output a sound of a front right mid-range (FR-Mid-Range) channel.

In addition, as the display apparatuses 100 corresponding to the location information (3, 2) and the location information (3, 3) are located in the very center inside the modular display apparatus 1000, the output set values may be changed to output sounds of center channels.

The sound channels of the speakers 120 that can be output are not fixed according to the location information of the display apparatuses 100, and it is obvious that the sound channels of the speakers 120 that can be output can be changed according to, for example, the sound channel information corresponding to the location information, a user's setting, the type of an image, and/or the time when an image is output.

For example, if the type of an image is news instead of a movie or a game, the number of the channels can be set as a relatively few number channels such as in a mono configuration (e.g., 1 channel) or a stereo configuration (e.g., 2 channels, 2.1 channels), but not a multi-channel configuration such as in a 7.1 or 5.1 channel configuration.

As illustrated in FIG. 6, the speakers 120 included in the plurality of respective display apparatuses 100-1, ..., 100-$n$ may not output sound signals corresponding to the same sound channel, but output sound signals corresponding to different channels from one another according to the locations of the plurality of respective display apparatuses 100-1, ..., 100-$n$, and thus distortion according to wave interference, etc. may not occur.

Figure 7:
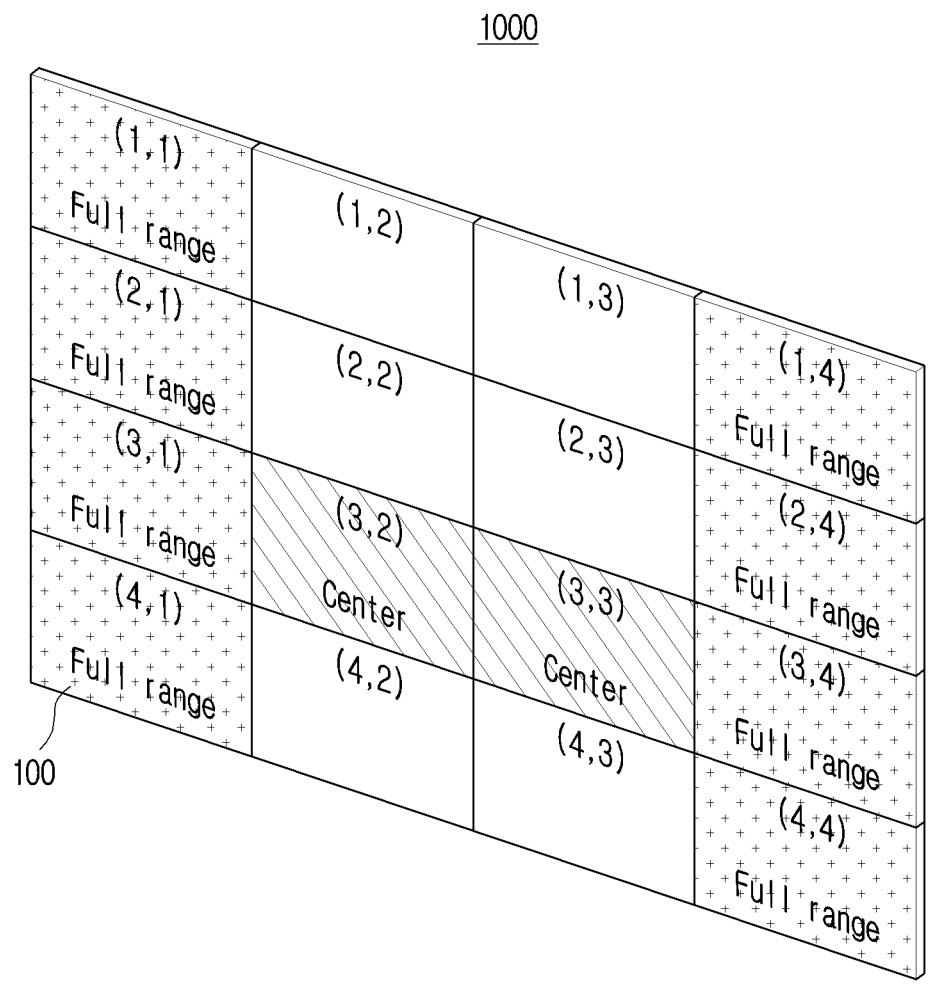
FIG. 7 is a diagram illustrating operations of speakers included in a plurality of respective display apparatuses according to still another embodiment of the disclosure.

FIG. 7 is a diagram illustrating operations of speakers included in a plurality of respective display apparatuses according to still another embodiment of the disclosure.

The setting of the speakers 120 included in the plurality of respective display apparatuses 100-1, ..., 100-$n$ in FIG. 5 and FIG. 6 is merely an example, and the disclosure is not limited thereto.

For example, referring to FIG. 7, some of the speakers 120 included in the plurality of respective display apparatuses 100-1, ..., 100-$n$ can be set to output a received sound signal without distinction of pitch ranges and channels, and the others can be set to be muted.

For example, a case wherein it is not necessary to output a sound signal by distinguishing it into multi channels according to the type of an image output by the modular display apparatus 1000 or a user's setting, etc., or it is set to not output a sound signal by distinguishing it into multi channels can be assumed. In the case of a video conference, news watching, etc., a sound signal may not be output by being distinguished into multi channels, and some speakers 120 may be set as a full range.

As described above, the display apparatus 100 according to an embodiment of the disclosure may include a memory (not shown).

The memory may store data necessary for the various embodiments of the disclosure. The memory may be implemented in a form of a memory embedded in the display apparatus 100, or in a form of a memory that can be attached to or detached from the display apparatus 100, according to the usage of stored data. For example, in the case of data for operating the display apparatus 100, the data may be stored in a memory embedded in the display apparatus 100, and in the case of data for an extended function of the display apparatus 100, the data may be stored in a memory that can be attached to or detached from the display apparatus 100. In the case of a memory embedded in the display apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the display apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

According to an embodiment, the memory may store a computer program including at least one instruction or instructions for controlling the display apparatus 100.

In particular, the memory may store information on pitch ranges that can be output according to the location information of the plurality of respective display apparatuses 100-1, ..., 100-$n$ inside the modular display apparatus 1000, or sound channel information corresponding to the location information of the plurality of respective display apparatuses 100-1, ..., 100-$n$ inside the modular display apparatus 1000.

Here, the information on pitch ranges that can be output according to the location information, or the sound channel information corresponding to the location information can be referred to, for example, as layout information, speaker setting information.

The processor 130 according to an embodiment of the disclosure may receive a user instruction, a user setting, etc. through a UI for setting sound channel information corresponding to the location information of the plurality of respective display apparatuses 100-1, ..., 100-$n$.

Then, the processor 130 may set a sound channel corresponding to the location information of the display apparatus 100 based on the user instruction. Then, the processor 130 may change the output set value of the speaker 120 included in the display apparatus 100 according to the sound channel.

Figure 8:
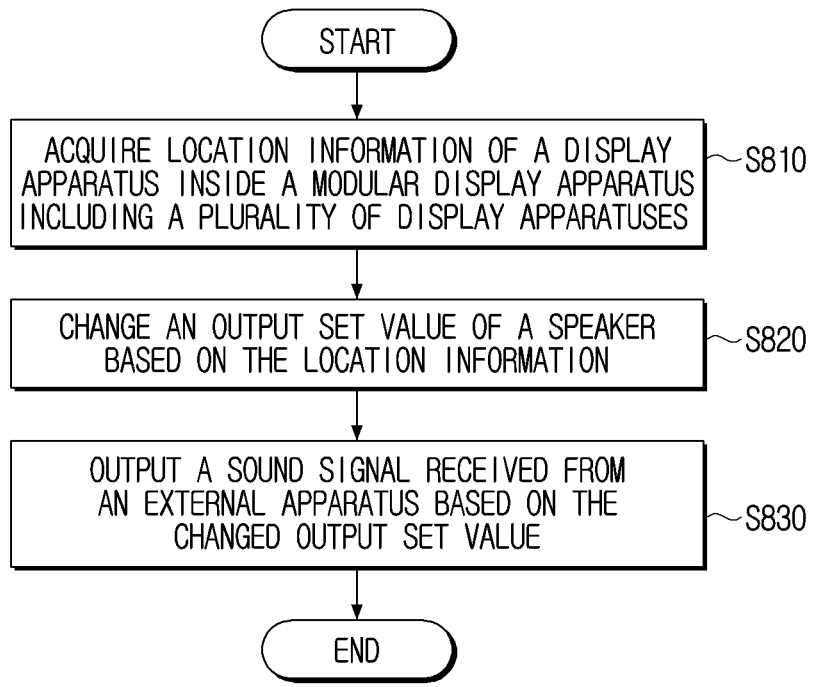
FIG. 8 is a flow chart illustrating a control method of an electronic apparatus according to an embodiment of the disclosure.

FIG. 8 is a flow chart illustrating a control method of an electronic apparatus according to an embodiment of the disclosure.

In a control method of a display apparatus, first, location information of the display apparatus inside a modular display apparatus including a plurality of display apparatuses may be acquired in operation S810.

Then, an output set value of a speaker included in the display apparatus may be changed based on the location information in operation S820.

Then, the speaker may be controlled to output a sound signal received from an external apparatus based on the changed output set value in operation S830. Here, the external apparatus may include at least one of another display apparatus adjacent to the display apparatus among the plurality of display apparatuses or a source apparatus.

The display apparatus, in some embodiments of the disclosure may include sound channel information corresponding to location information of the plurality of respective display apparatuses, and the operation S820 of changing the output set value may include the steps of identifying a sound channel corresponding to the location information of the display apparatus based on the stored sound channel information, and changing the output set value of the speaker to correspond to the identified sound channel.

The speaker, in some embodiments may include a full range speaker, and the operation S820 of changing the output set value may include the steps of acquiring a gain value corresponding to the identified sound channel among gain values corresponding to the plurality of respective sound channels, and changing an output set value of the full range speaker according to the acquired gain value.

The control method may further include the step of, based on a sound signal received from the external apparatus being a multi-channel sound signal including sound signals corresponding to the plurality of respective sound channels, acquiring a sound signal corresponding to the identified sound channel, and the operation S830 of controlling the speaker may include the step of controlling the speaker to output the acquired sound signal.

The control method may further include the steps of, based on the location information of the display apparatus, controlling the speaker such that the output of the speaker is muted, and controlling the display to output some images corresponding to the location information among images corresponding to a video signal received from the external apparatus.

Also, the operation S820 of changing the output set value may include the steps of, based on the display apparatus being located relatively on the upper side inside the modular display apparatus on the basis of the location information of the display apparatus, changing the output set value such that the speaker corresponds to a tweeter speaker outputting a sound of a high pitch range, based on the display apparatus being located relatively in the center inside the modular display apparatus, changing the output set value such that the speaker corresponds to a mid-range speaker outputting a sound of a middle pitch range, and based on the display apparatus being located relatively on the lower side inside the modular display apparatus, changing the output set value such that the speaker corresponds to a woofer speaker outputting a sound of a low pitch range.

Also, the operation S820 of changing the output set value may include the steps of, based on the display apparatus being located relatively on the left side inside the modular display apparatus on the basis of the location information of the display apparatus, changing the output set value to correspond to a speaker outputting a sound of a left channel, and based on the display apparatus being located relatively on the right side inside the modular display apparatus on the basis of the location information of the display apparatus, changing the output set value to correspond to a speaker outputting a sound of a right channel.

The control method may include the step of providing the received sound signal to another display apparatus that is connected to the display apparatus and arranged to be adjacent among the plurality of display apparatuses.

Further, the control method may further include the steps of, based on receiving a user instruction through a UI for setting sound channel information corresponding to the location information of the plurality of respective display apparatuses, identifying sound channel information of the speaker based on the user instruction, and changing the output set value of the speaker to correspond to the identified sound channel information.

Also, the operation S810 of acquiring the location information may include the step of, based on receiving a user input indicating the number and the arrangement relation of the plurality of display apparatuses, acquiring the location information of the plurality of respective display apparatuses based on the user input.

Additionally, the various embodiments of the disclosure can be applied to all types of electronic apparatuses including a display.

Further, the various embodiments described above may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Additionally, computer instructions for performing processing operations of an electronic apparatus according to the aforementioned various embodiments of the disclosure may be stored in a non-transitory computer-readable medium. Computer instructions stored in such a non-transitory computer-readable medium may make the processing operations at the electronic apparatus 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display apparatus configured to be included with other display apparatuses of a plurality of display apparatuses in a modular display apparatus, the display apparatus comprising:
   a display;
   a speaker; and
   at least one processor configured to:
      acquire location information of the display apparatus inside the modular display apparatus,
      change an output set value of the speaker based on the location information, and
      control the speaker to output a sound signal received from an external apparatus based on the changed output set value,
   wherein the external apparatus comprises:
      at least one of (i) at least one of the other display apparatuses that is adjacent to the display apparatus and (ii) a source apparatus, and
   wherein the at least one processor is further configured to:
      change the output set value such that the speaker corresponds to a tweeter speaker corresponding to a high pitch range based on the location information of the display apparatus corresponding to a first position inside the modular display apparatus, and
      change the output set value such that the speaker corresponds to a woofer speaker corresponding to a low pitch range based on the location information of the display apparatus corresponding to a second position inside the modular display apparatus.

2. The display apparatus of claim 1, further comprising:
   a memory configured to store sound channel information corresponding to location information respectively of each of the plurality of display apparatuses,
   wherein the at least one processor is further configured to:
      identify a sound channel corresponding to the location information of the display apparatus based on the sound channel information stored in the memory, and
      change the output set value of the speaker to correspond to the identified sound channel.

3. The display apparatus of claim 2,
   wherein the speaker comprises a full range speaker;
   wherein the at least one processor is further configured to:
      acquire a gain value corresponding to the identified sound channel, and change an output set value of the full range speaker according to the acquired gain value.

4. The display apparatus of claim 2,
wherein the at least one processor is further configured to:
based on a sound signal received from the external apparatus being a multi-channel sound signal, acquire a sound signal corresponding to the identified sound channel, and
control the speaker to output the acquired sound signal.

5. The display apparatus of claim 1,
wherein the at least one processor is further configured to:
based on the location information of the display apparatus, control the speaker such that the output of the speaker is muted, and
control the display to output some images corresponding to the location information among images corresponding to a video signal received from the external apparatus.

6. The display apparatus of claim 1,
wherein the at least one processor is further configured to:
based on the display apparatus being located relatively on the upper side inside the modular display apparatus on the basis of the location information of the display apparatus, change the output set value such that the speaker corresponds to the tweeter speaker outputting the sound of the high pitch range,
based on the display apparatus being located relatively in the center inside the modular display apparatus, change the output set value such that the speaker corresponds to a mid-range speaker outputting a sound of a middle pitch range, and
based on the display apparatus being located relatively on the lower side inside the modular display apparatus, change the output set value such that the speaker corresponds to the woofer speaker outputting a sound of the low pitch range.

7. The display apparatus of claim 1,
wherein the at least one processor is further configured to:
based on the display apparatus being located relatively on the left side inside the modular display apparatus on the basis of the location information of the display apparatus, change the output set value to correspond to a speaker outputting a sound of a left channel, and
based on the display apparatus being located relatively on the right side inside the modular display apparatus on the basis of the location information of the display apparatus, change the output set value to correspond to a speaker outputting a sound of a right channel.

8. The display apparatus of claim 1,
wherein the at least one processor is further configured to:
provide the received sound signal to another display apparatus that is connected to the display apparatus and arranged to be adjacent among the plurality of display apparatuses.

9. The display apparatus of claim 1,
wherein the at least one processor is further configured to:
based on receiving a user instruction through a UI for setting sound channel information corresponding to the location information of the plurality of respective display apparatuses, identify sound channel information of the speaker based on the user instruction, and
change the output set value of the speaker to correspond to the identified sound channel information.

10. The display apparatus of claim 1,
wherein the at least one processor is further configured to:
based on receiving a user input indicating a number and an arrangement relation of the plurality of display apparatuses, acquire the location information of the plurality of respective display apparatuses based on the user input.

11. A control method of a display apparatus configured to be included with other display apparatuses of a plurality of display apparatuses in a modular display apparatus, the display apparatus including a display, a speaker, and at least one processor, the control method comprising:
acquiring, using the at least one processor, location information of the display apparatus inside the modular display apparatus;
changing, using the at least one processor, an output set value of a of the speaker included in the display apparatus based on the location information; and
controlling, using the at least one processor, the speaker to output a sound signal received from an external apparatus based on the changed output set value,
wherein the external apparatus comprises:
at least one of (i) at least one of the other display apparatuses that is adjacent to the display apparatus, and (ii) a source apparatus, and
wherein the changing the output set value of the speaker comprises:
changing the output set value such that the speaker corresponds to a tweeter speaker corresponding to a high pitch range based on the location information of the display apparatus corresponding to a first position inside the modular display apparatus, and
changing the output set value such that the speaker corresponds to a woofer speaker corresponding to a low pitch range based on the location information of the display apparatus corresponding to a second position inside the modular display apparatus.

12. The control method of claim 11,
wherein the display apparatus comprises:
sound channel information corresponding to location information respectively of each of the plurality of display apparatuses, and
wherein the changing the output set value comprises:
identifying a sound channel corresponding to the location information of the display apparatus based on the stored sound channel information; and
changing the output set value of the speaker to correspond to the identified sound channel.

13. The control method of claim 12,
wherein the speaker comprises a full range speaker;
wherein the changing the output set value comprises:
acquiring a gain value corresponding to the identified sound channel; and
changing an output set value of the full range speaker according to the acquired gain value.

14. The control method of claim 12, further comprising:
based on a sound signal received from the external apparatus being a multi-channel sound signal, acquiring a sound signal corresponding to the identified sound channel,
wherein the controlling the speaker comprises:
controlling the speaker to output the acquired sound signal.

15. The control method of claim 11, further comprising:
based on the location information of the display apparatus, controlling the speaker such that the output of the speaker is muted; and
controlling the display to output some images corresponding to the location information among images corresponding to a video signal received from the external apparatus.

16. The control method of claim 11, further comprising
based on the display apparatus being located relatively on the upper side inside the modular display apparatus on the basis of the location information of the display apparatus, changing the output set value such that the speaker corresponds to the tweeter speaker outputting the sound of the high pitch range,
based on the display apparatus being located relatively in the center inside the modular display apparatus, changing the output set value such that the speaker corresponds to a mid-range speaker outputting a sound of a middle pitch range, and
based on the display apparatus being located relatively on the lower side inside the modular display apparatus, changing the output set value such that the speaker corresponds to the woofer speaker outputting the sound of the low pitch range.

17. The control method of claim 11, further comprising
based on the display apparatus being located relatively on the left side inside the modular display apparatus on the basis of the location information of the display apparatus, changing the output set value to correspond to a speaker outputting a sound of a left channel, and
based on the display apparatus being located relatively on the right side inside the modular display apparatus on the basis of the location information of the display apparatus, changing the output set value to correspond to a speaker outputting a sound of a right channel.

18. The control method of claim 11, further comprising providing the received sound signal to another display apparatus that is connected to the display apparatus and arranged to be adjacent among the plurality of display apparatuses.

19. The control method of claim 11, further comprising based on receiving a user instruction through a UI for setting sound channel information corresponding to the location information of the plurality of respective display apparatuses, identifying sound channel information of the speaker based on the user instruction, and changing the output set value of the speaker to correspond to the identified sound channel information.

20. The control method of claim 11, further comprising based on receiving a user input indicating a number and an arrangement relation of the plurality of display apparatuses, acquiring the location information of the plurality of respective display apparatuses based on the user input.

* * * * *